(12) United States Patent
Talwar et al.

(10) Patent No.: US 9,069,730 B2
(45) Date of Patent: Jun. 30, 2015

(54) COORDINATED RELIABILITY MANAGEMENT OF VIRTUAL MACHINES IN A VIRTUALIZED SYSTEM

(75) Inventors: Vanish Talwar, Palo Alto, CA (US); Sanjay Kumar, Atlanta, GA (US); Parthasarathy Ranganathan, Fremont, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1242 days.

(21) Appl. No.: 12/493,602

(22) Filed: Jun. 29, 2009

(65) Prior Publication Data

US 2010/0333089 A1 Dec. 30, 2010

(51) Int. Cl.
*G06F 9/455* (2006.01)
*G06F 9/46* (2006.01)
*G06F 11/00* (2006.01)
*G06F 11/20* (2006.01)
*G06F 11/30* (2006.01)
*G06F 11/07* (2006.01)

(52) U.S. Cl.
CPC ............ *G06F 11/203* (2013.01); *G06F 11/004* (2013.01); *G06F 11/0754* (2013.01); *G06F 11/301* (2013.01); *G06F 11/3089* (2013.01); *G06F 2009/45562* (2013.01); *G06F 2201/815* (2013.01); *G06F 9/45558* (2013.01)

(58) Field of Classification Search
None
See application file for complete search history.

(56) References Cited

U.S. PATENT DOCUMENTS

| 6,772,099 | B2 * | 8/2004 | Merkin et al. | 702/188 |
|---|---|---|---|---|
| 7,536,595 | B1 * | 5/2009 | Hiltunen et al. | 714/26 |
| 7,555,412 | B2 * | 6/2009 | Nath et al. | 702/188 |
| 8,271,984 | B2 * | 9/2012 | Stolpe | 718/102 |
| 2004/0003319 | A1 * | 1/2004 | Ukai et al. | 714/25 |
| 2005/0262394 | A1 * | 11/2005 | Yasukawa et al. | 714/23 |
| 2005/0268065 | A1 * | 12/2005 | Awada et al. | 711/173 |
| 2006/0005063 | A1 * | 1/2006 | Patrick et al. | 714/1 |
| 2006/0143496 | A1 * | 6/2006 | Silverman | 714/4 |
| 2007/0050776 | A1 * | 3/2007 | Ferren et al. | 718/104 |
| 2007/0101202 | A1 * | 5/2007 | Garbow | 714/47 |
| 2007/0220376 | A1 * | 9/2007 | Furukawa | 714/57 |
| 2008/0022278 | A1 * | 1/2008 | Gschwind et al. | 718/100 |
| 2008/0046960 | A1 * | 2/2008 | Bade et al. | 726/1 |
| 2008/0104587 | A1 * | 5/2008 | Magenheimer et al. | 718/1 |
| 2008/0163207 | A1 * | 7/2008 | Reumann et al. | 718/1 |
| 2008/0163239 | A1 * | 7/2008 | Sugumar et al. | 718/105 |
| 2008/0172554 | A1 * | 7/2008 | Armstrong et al. | 713/2 |
| 2008/0189700 | A1 * | 8/2008 | Schmidt et al. | 718/1 |
| 2008/0208367 | A1 * | 8/2008 | Koehler et al. | 700/19 |

(Continued)

OTHER PUBLICATIONS

Sanjay Kumar, et al., "vManage: Loosely Coupled Platform and Virtualization Management in Data Centers", May 21, 2009, 10 pgs., pl.hp.com/techreports/2009/HPL-2009.

(Continued)

*Primary Examiner* — Tammy Lee
(74) *Attorney, Agent, or Firm* — Leffert, Jay and Polgaze PA

(57) ABSTRACT

A system and methods for reliability management of virtual machines in a host system. The reliability of the host system is monitored and compared with a reliability threshold level for a virtual machine. If the reliability of the host system drops below the reliability threshold level, the virtual machine is migrated to another host system having an appropriate level of reliability.

17 Claims, 4 Drawing Sheets

(56) References Cited

U.S. PATENT DOCUMENTS

| | | | |
|---|---|---|---|
| 2008/0222375 A1* | 9/2008 | Kotsovinos et al. | 711/162 |
| 2008/0295096 A1* | 11/2008 | Beaty et al. | 718/1 |
| 2008/0313641 A1* | 12/2008 | Inoue et al. | 718/104 |
| 2009/0070628 A1* | 3/2009 | Gupta et al. | 714/26 |
| 2009/0138752 A1* | 5/2009 | Graham et al. | 714/4 |
| 2010/0017800 A1* | 1/2010 | Dow et al. | 718/1 |
| 2010/0058342 A1* | 3/2010 | Machida | 718/1 |
| 2010/0242045 A1* | 9/2010 | Swamy et al. | 718/104 |
| 2010/0318837 A1* | 12/2010 | Murphy et al. | 714/4 |

OTHER PUBLICATIONS

Vanish Talwar, et al. "Coordinated Management in Virtualized Systems Using Management Brokers and Management Channels", filed Sep. 30, 2008, U.S. Appl. No. 12/243,111, 36 pgs.

Vanish Talwar, et al. "Information Model Registry and Brokering in Virtualized Environments", filed Oct. 13, 2008, U.S. Appl. No. 12/250,924, 50 pgs.

Vanish Talwar, et al. "Cross-Layer Power Management in a Multi-Layer System", filed Oct. 9, 2008, U.S. Appl. No. 12/248,648, 42 pgs.

* cited by examiner

COORDINATED RELIABILITY MANAGEMENT OF VIRTUAL MACHINES IN A VIRTUALIZED SYSTEM

BACKGROUND

A Virtual Machine (VM) is an environment, usually a program or operating system, that does not physically exist but is created within another environment. In this context, the VM is called a "guest" while the environment it runs within is called a "host". Virtual machines can be created to execute an instruction set different than that of the host environment. One host environment (e.g., computer system) can run multiple virtual machines simultaneously. Since virtual machines are separated from the physical resources they use (i.e., memory, CPU cycles), the host environment is often able to dynamically assign those resources among them.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure. It is to be understood that other embodiments may be utilized and that process or mechanical changes may be made without departing from the scope of the present disclosure. The following detailed description is, therefore, not to be taken in a limiting sense, and the scope of the present disclosure is defined by the appended claims and equivalents thereof.

Figure 1:
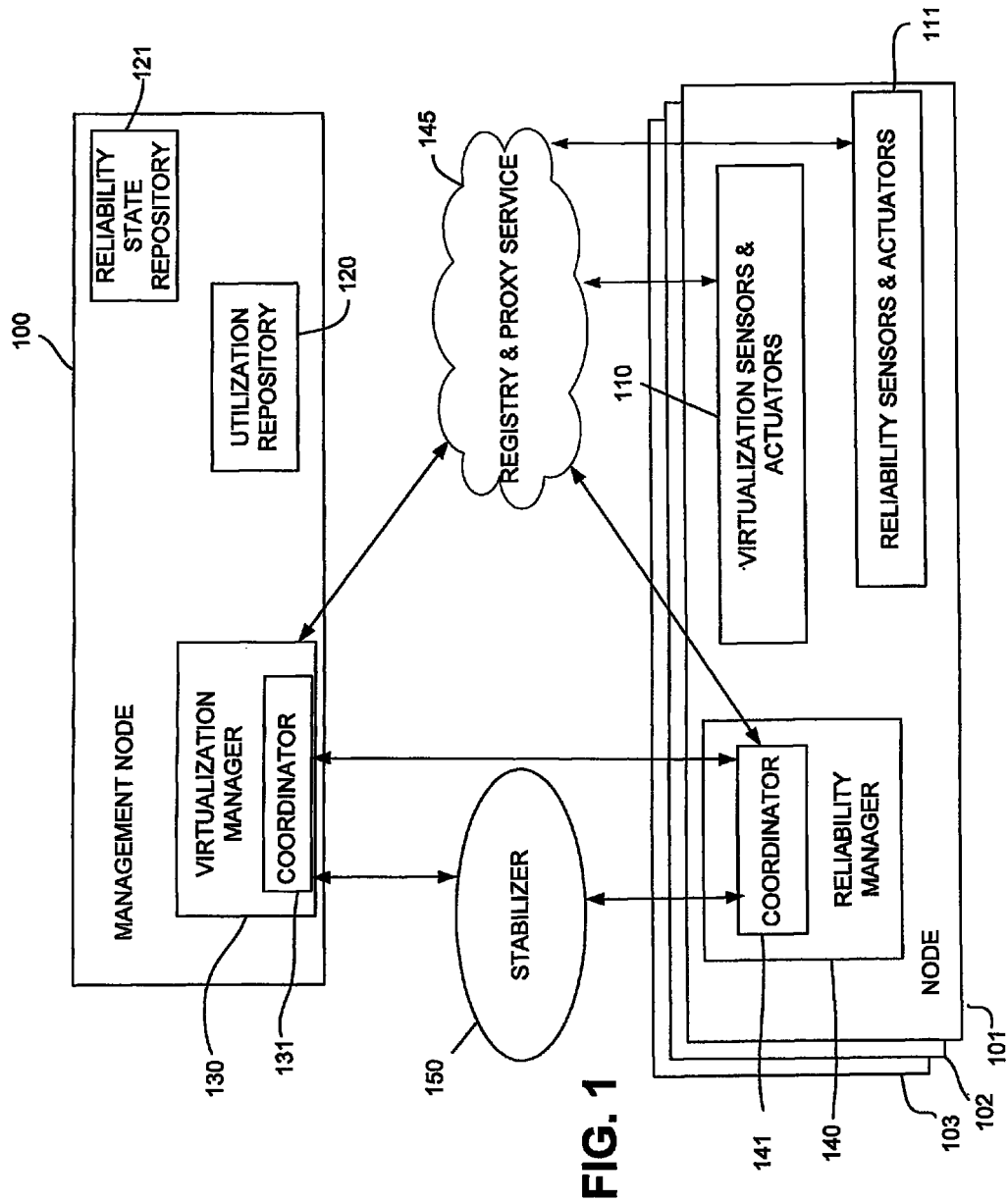
FIG. 1 depicts a block diagram of one example embodiment of a coordinated reliability management system incorporating a virtual machine.

FIG. 1 illustrates a block diagram of one example embodiment of a coordinated reliability management system that incorporates a virtual machine. Such an embodiment is an example of a host system that can be comprised of hardware and/or software and can execute embodiments of coordinated reliability management. In one example embodiment, the host system is a node that includes a reliability manager and a coordinator as illustrated below. This system uses a cross-layer coordinated scheme that enables a coordination block to continuously match a platform's monitored parameters with a VM's availability requirements. This block diagram can be incorporated in a host system such as a computer system comprising a processor, memory, and input/output devices.

In one example embodiment, the monitored system parameters that can affect host reliability include disk error data, processor machine check event data, bus error data, as well as other system information. The monitored system parameters are used to model the reliability of the host system in terms of different reliability levels. For example, one set of reliability levels might go from extremely reliable to extremely unreliable. This information is then used to determine whether to preemptively migrate the VMs to more reliable host systems. These monitored parameters may be defined in a service level agreement.

FIG. 1 shows the architecture for coordinating platform and virtualization management. Each node 101-103 has multiple sensors 110, 111 and actuators across platforms and across virtualization domains. In one example embodiment, sensor inputs are monitored sensor data, as defined subsequently, per a service level agreement. The sensor data across multiple nodes are aggregated and stored in cluster-level repositories 120, 121. In addition, each node 101-103 hosts a Platform Manager (PM) for hardware-related attributes, such as reliability. A cluster management node 100 hosts a virtualization manager 130 to manage virtual machines through their lifecycle. In such a system, coordination occurs at two levels: platform-aware virtualization management at the cluster management node, and virtualization-aware platform management on each node. In some example embodiments, as is more fully illustrated below, the cluster management node 100 facilitates the migration a VM from one node to another node.

In some example embodiments, the virtualization manager 130 utilizes a spanning tree algorithm to identify and map the nodes 101-103 that are operatively connected to the cluster management node 100. The results of the execution of this spanning tree algorithm are stored into a data structure that includes the identities of each of the nodes 101-103. Operatively connected includes a logical or physical connection.

Coordination is achieved using two basic design elements that jointly provide the needed information exchange and policy execution. The first element is a registry & proxy service 145 that provides discovery, meta-data registration and proxying of calls to the appropriate sensors/actuators across hardware and software. The second element is a coordinator agent 141 that interfaces to the registry & proxy service 145 through well-defined Application Programming Interfaces (APIs), and implements data/control policies for coordination in a platform independent manner. Coordinators 131, 141 implement policies for platform-aware virtualization management and for virtualization-aware platform management and they are depicted in FIG. 1 as plug-ins to existing managers (a coordinator can also be hosted as a separate service without loss of functionality). In addition, a special coordinator agent 150 (i.e., stabilizer) interfaces to the respective plug-ins. The stabilizer 150 ensures system stability and prevents coordinators 130, 141 from taking redundant and unnecessary actions.

The registry & proxy service 145 performs two functions—(i) discovery and meta-data registration for sensors/actuators, and (ii) dynamic redirection of calls (proxying) to appropriate sensor/actuators. Well-known protocols are used for discovery and meta-data registration including the use of leases. However, for scalability purposes, the registry & proxy service 145 is designed in a distributed manner with per-node registries linked via an overlay.

The registry & proxy service 145 leverages existing industry standards based protocols so as to communicate with a single "language" to the diverse sensor/actuator interfaces. While the registry service performs discovery and metadata registration continuously in the background, the coordination agent is active only during the dynamic phase of policy execution. During this phase, it queries the registry service and becomes aware of the meta-data of available sensors/actuators. It then requests specific data from the diverse sensors across hardware-software to be fetched (unified monitoring).

The registry & proxy service 145 obtains this data by communicating using the underlying protocols to the appropriate sensors.

The separation of registry & proxy services 145 and coordination agents 131, 141 allows policy development to occur without having to deal with low-level implementation issues. These issues include how to communicate, how to discover the diverse sensors across the virtualization and platforms domains, and how to access diverse software vs. hardware sensors. The resulting loose coupling allows the controllers, sensors, and actuators to (i) be not aware of each other directly, (ii) enter and leave the system dynamically without breaking dependencies (especially important in a virtualized environment where virtual machines can be migrated), (iii) be provided by multiple vendors and/or use different data models. Furthermore, as shown in FIG. 1, coordinator agents 131, 141 can be merged with existing controllers as loosely-coupled plug-ins, which preserves prior investments and leverages existing industry trends.

The coordinator 131 at the cluster level enhances traditional virtualization management solutions that consider virtual machine metrics such as CPU, memory, network bandwidth, and virtual machine priority. In one example embodiment, the traditional virtualization management solutions do not take into account platform requirements such as power budget or attributes like platform reliability or trust. As an example, virtual machine placement is the task of selecting the most suitable host for a virtual machine for initial provisioning and subsequent migrations. By not considering platform attributes during virtual machine placement, management must rely on runtime techniques like workload balancing so as to meet power budget violations or host failures. However, workload balancing can be expensive and can at times result in system downtime. It would be desirable, therefore, to have a solution that can minimize power budget violations or virtual machine downtime and thus reduce costly runtime actions.

The coordinator 131 addresses this problem by employing a multi-pass algorithm that considers both the virtual machine and platform metrics when making placement decisions, thus avoiding bad decisions that lead to early power budget violations or system downtimes. Toward this end, it uses the registry & proxy service 145 to obtain access to system reliability data. Being a plug-in to the virtualization manager 130, it has internal access to the system utilization information as well.

In operation, the coordinator 131 first obtains a list of nodes (provided by the virtualization manager 130) that satisfies the new (or migrating) virtual machine's various resource requirements (CPU, memory etc.) Thereafter, it queries the registry and proxy service to obtain information on the available reliability state repositories in the cluster. When found, the reliability state repository is queried to obtain the current reliability states for all nodes satisfying the VM's requirements. Reliability filtering is then applied on these nodes checking that the node will not violate the availability requirement of the VM when deployed on it. From these filtered nodes, a final node is selected for VM placement using a predetermined policy. For example, the coordinator can select the first "matching" node that satisfies VM resource and reliability requirements, or perform a best match (e.g., the most idle host for a VM). Alternatively, the coordinator chooses a node that ensures system stability, i.e., would satisfy both the VM and platform requirements for a sufficient period of time into the future with the stability checks provided through the stabilizer 150. Once the final node is selected by the coordinator 131, the virtualization manger 130 deploys the VM on that chosen node based on the selection.

At the per-node level, the coordination agent 141, traditional platform management solutions typically make decisions based on lower level metrics obtained through hardware sensors and performance counters. They have no direct feedback from higher layers. On the other hand, virtualization runtime management solutions (e.g., virtual machine migrations to meet performance goals) make their decisions based on higher level metrics only obtained through virtualization and application sensors.

The coordinator agent plug-in 141 interfaces with the reliability manager 140 to address these problems. Periodically, the reliability manager 140 scans the hardware sensor logs such as Intelligent Platform Management Interface (IPMI) sensor data for any errors (e.g., bus error, fan failure etc.) and uses a reliability model to determine the current reliability state of the system (e.g., the node 101). The model is known a priori or learned dynamically using techniques like machine learning algorithms. Accurate predictions of the reliability state, i.e., of impending failures, are then matched to higher layer VM availability SLA requirements (access to SLA sensors are obtained through the registry and proxy services), and on a mismatch, the coordination architecture leverages the richness of actuators and preemptively migrates VMs to more reliable hosts, thus improving overall availability of VMs. The coordinator agent 141 maps hardware reliability states to virtual machine requirements and initiates virtual machine migration to mitigate the effects of hardware failures. For example, a VM residing on the node 101 is migrated to the node 102.

Figure 2:
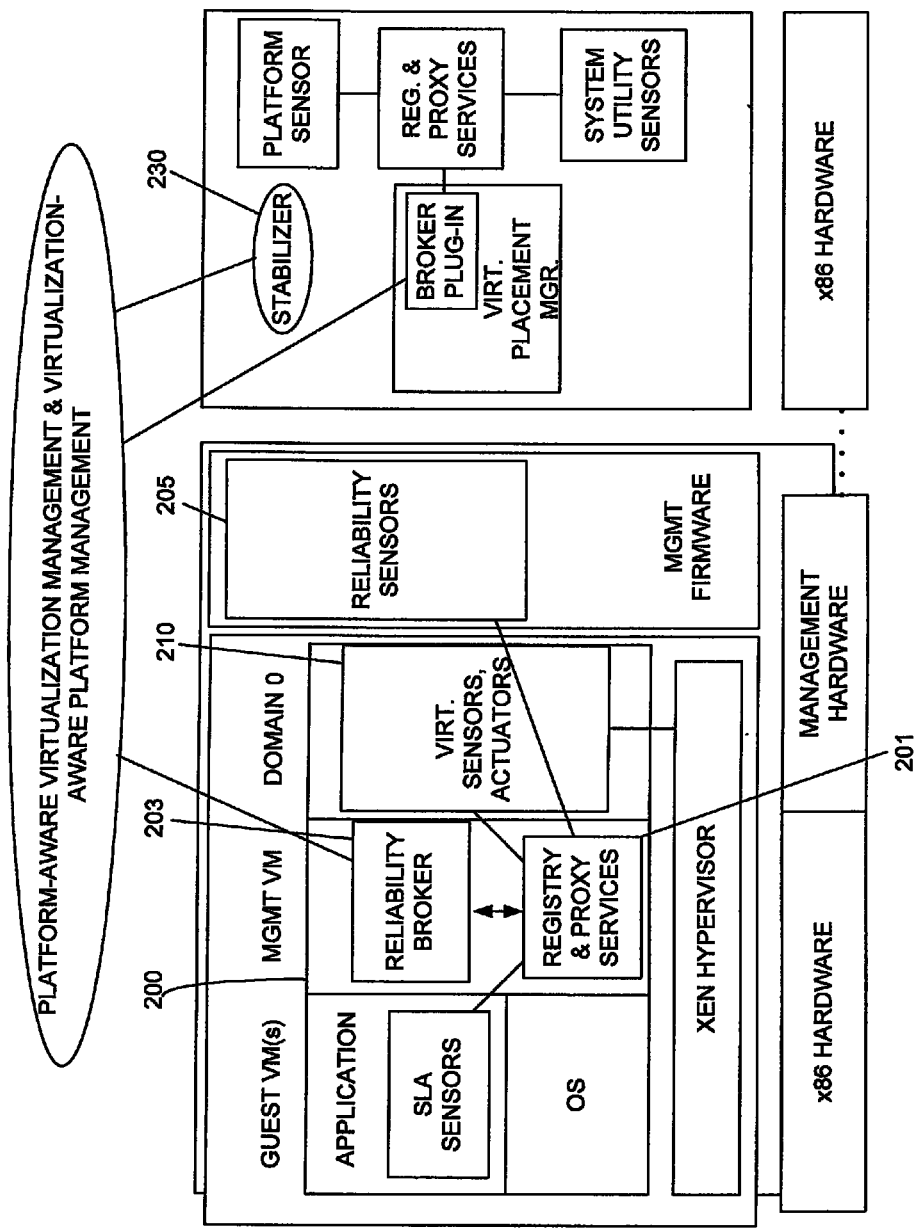
FIG. 2 depicts a conceptual block diagram of one example embodiment of a virtualized system.

FIG. 2 illustrates a conceptual block diagram of one example embodiment of a virtualized system. In one example embodiment, a separate domain is created within an XEN™ hypervisor with privileged access to selective management hardware. In some example embodiments, a hypervisor in lieu of the XEN™ hypervisor is implemented. A hypervisor or Virtual Machine Monitor (VMM) is a computer software/hardware platform virtualization software that allows multiple Operating Systems (OSs) to run on a host computer concurrently. These multiple operating systems, also referred to herein as Virtual Machines (VMs), may be implemented using any one of a number of virtualization schemes. These schemes include Full Virtualization, Hardware-Assisted Virtualization, Partial Virtualization, Paravirtualization, and Operating System-Level Virtualization.

This domain hosts the registry & proxy services 201, as well as the reliability coordinator 203. Since most of the per-host management code (including various management models, policies, and device drivers) run inside an isolated virtual machine, this reduces the Trusted Computing Base (TCB) of the VMM and, in turn, improves its security and reliability.

Also, although the coordinator 203 requires certain privileges for management, this is a subset of the privileges required by other distinguished virtual machines, ensuring improved robustness to failures compared to solutions in which such functions are integrated into the VMM. One other benefit is the virtual appliances 210. Having a separate virtual machine for management simplifies its deployment and its upgrades, by casting it into the form of a virtual machine appliance 210. In this form, the management virtual machine 200 can be deployed independently from the VMM, and it can be dynamically added or removed from a system.

The registry & proxy service 201 relies on an infrastructure to connect with the diversity of reliability sensors and actuators 205. Dynamism is handled through leases. When a request is made for monitoring or actuation, the registry & proxy service 201 leverages the discovery and namespace registration table to redirect the call to the appropriate location.

The coordinators are implemented at application level, as multithreaded processes where one or more threads perform the monitoring, protocol exchange, coordination, and actuation tasks. They interface with the registry service 201 and bind to the API libraries.

Figure 3:
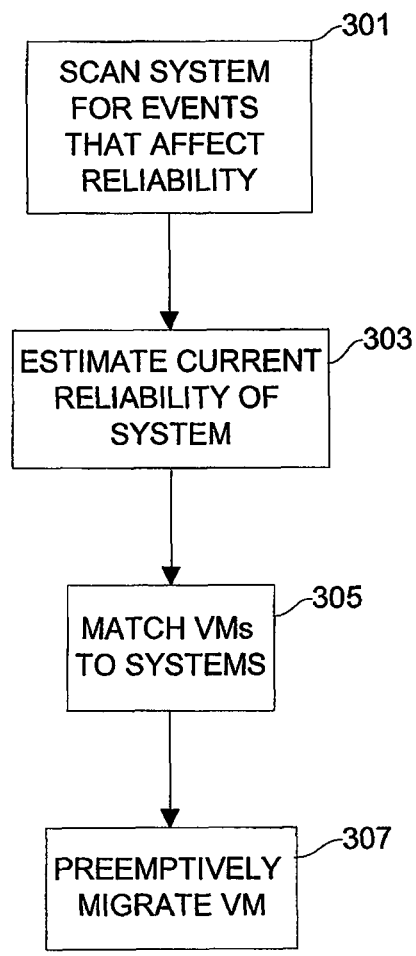
FIG. 3 depicts a flow chart of one example embodiment of a method for coordinated reliability management in a virtualized system.

FIG. 3 illustrates a flowchart of one example embodiment of a method for coordinated reliability management in a virtualized system. In one embodiment, this method can be executed in one or more of the Nodes 100-103 of FIG. 1. In some example embodiments, this method can be executed by a combination of one or more of the nodes 101-103, and the cluster management node 100.

An operation 301 is executed in which the host system (e.g., one or more computer systems each including controller, memory, and I/O) is monitored for events that might affect the reliability of the host. The monitoring can include scanning system logs that track such reliability altering events. For example, if the processor of the host system experiences an error, this event is stored in Machine Check Event (MCE) log for later access. An event can be defined in a service level agreement and can include such errors as bus errors, disk errors, or other errors that affect the host system reliability. This operation 301 may be executed by at least one of the nodes 101-103, and the reliability manager 140 residing thereon.

An operation 303 is executed to estimate the current reliability of the host system using the reliability altering events and a reliability model. The reliability model can be one that is stored in the system memory or changed dynamically using a learning algorithm such as a Bayesian algorithm. This operation 303 may be executed by at least one of the nodes 101-103, and the reliability manager 140 residing thereon.

In some example embodiments, the learning algorithm includes one or more of the following algorithms—Case-Based Reasoning, Bayesian networks that include Hidden Markov Models, Neural Networks, or Fuzzy Systems. The Bayesian networks may include—Machine Learning Algorithms including—Supervised Learning, Unsupervised Learning, Semi-Supervised Learning, Reinforcement Learning, Transduction, Learning to Learn Algorithms, or some other suitable Bayesian network. The Neural Networks may include: Kohonen Self-Organizing Network, Recurrent Networks, Simple Recurrent Networks, Hopfield Networks, Stochastic Neural Networks, Boltzmann Machines, Modular Neural Networks, Committee of Machines, Associative Neural Network (ASNN), Holographic Associative Memory, Instantaneously Trained Networks, Spiking Neural Networks, Dynamic Neural Networks, Cascading Neural Networks, Neuro-Fuzzy Networks, or some other suitable Neural Network.

In some example embodiments, some type of advanced statistical method or algorithm may be employed via the operation 303. These methods may include the use of Statistical Clusters, K-Means, Random Forests, Markov Processes, or some other suitable statistical method, or algorithm. One or more of these advanced statistical methods may be used to create the reliability model.

An operation 305 is executed to match the VMs to the host systems based on the desired reliability for the VM and the predicted reliability of each host system. For example, if a particular VM requires an extremely high level of reliability, it would be matched with a host system that is predicted to have that level of reliability or greater. This operation 305 may be executed by the cluster management node 100, and the coordinator agent 131 residing thereon. In the alternative, this operation 305 may be executed by at least one of the nodes 101-103, and the coordinator agent 141 residing thereon. In some example embodiments, these coordinator agents 131 and 141 work in combination.

An operation 307 is executed to preemptively migrate the VMs from the memory of its current host system to the memory of another host system that exhibits the desired reliability level for that particular VM. For example, if a particular VM requires a high reliability level and its current host system is predicted to have a relatively low reliability level, the VM can be migrated to another host having the high reliability level. This operation 307 may be executed by the cluster management node 100 and the virtualization manager 130 residing thereon.

Typically, solutions for VM placement in a host system take into account VM metrics such as CPU, memory, network bandwidth, and VM priority. However, service level agreement data for a particular VM may call for a certain level of reliability for that VM. As a result, if the host fails, the availability requirements of the VM might not be met, leading to undesirable down time.

By moving a VM after an indication that the current host does not meet the desired reliability levels or proactively moving the VM when a failure probability for the host is greater than a predetermined threshold, the virtualized system and method for coordinated reliability management can reduce the down time of virtual machines and improve availability. The VM migration is seamless to any applications running on the VM. The host reliability, reliability thresholds, and failure probabilities can be defined in the service level agreement.

Similar to compute node reliability, storage node reliability can be monitored (e.g., monitoring Self-Monitoring and Reporting Technology (SMART) data) and used to predict impending disk failures. When the host system is a storage node comprising means for storage (e.g., magnetic disk, optical disk, semiconductor storage), the coordinator can then perform proactive backup or use techniques (e.g., VMWARE's STORAGE VMOTION™) to improve VM's and its data availability.

Figure 4:
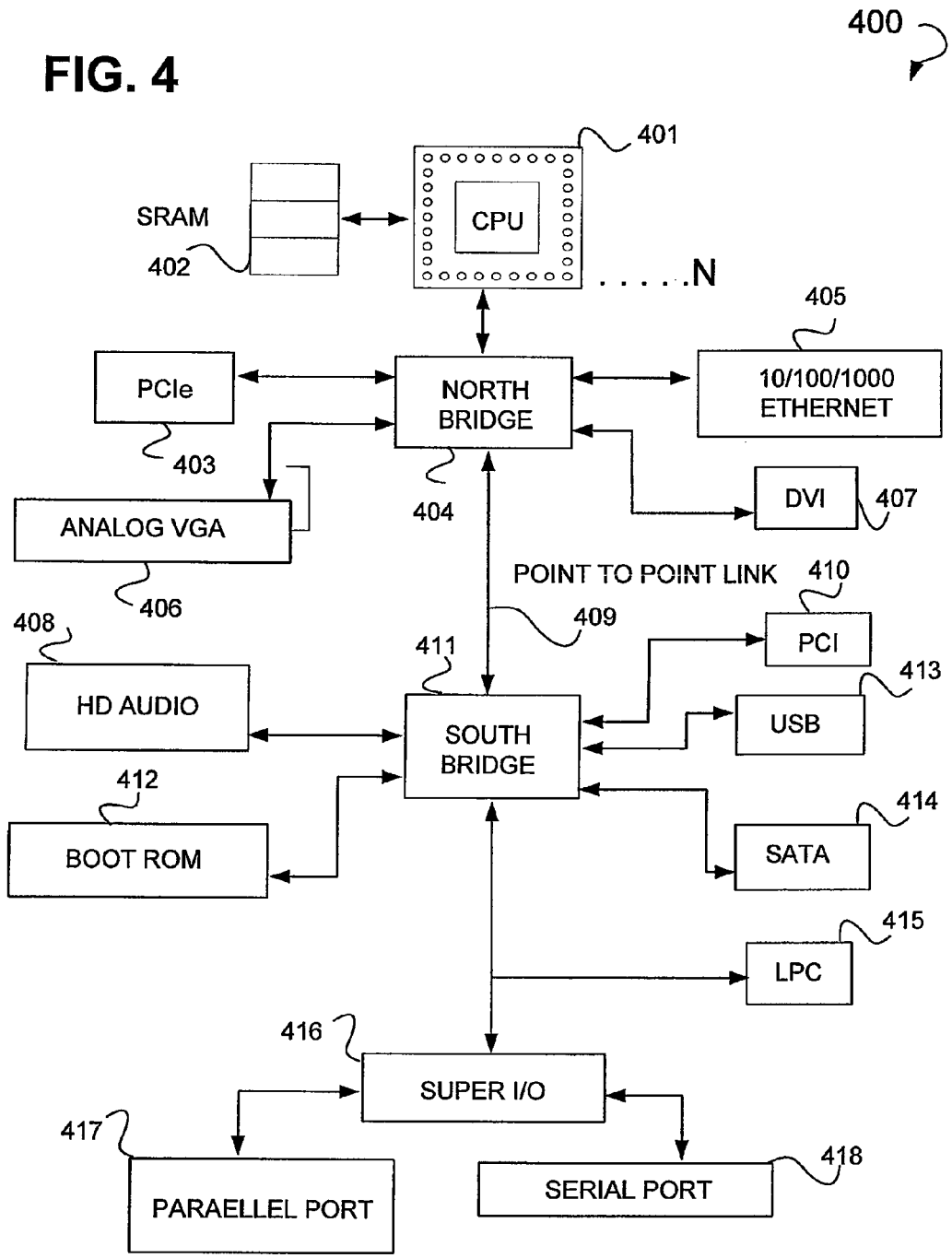
FIG. 4 depicts a diagram of an example host system.

FIG. 4 is a diagram of an example computer system 400. Shown is a Central Processing Unit (CPU) 401. The processor die 201 may be a CPU 401. In some example embodiments, a plurality of CPU may be implemented on the computer system 400 in the form of a plurality of core (e.g., a multi-core computer system), or in some other suitable configuration. Some example CPUs include the x86 series CPU. Operatively connected to the CPU 401 is Static Random Access Memory (SRAM) 402. Operatively connected includes a physical or logical connection such as, for example, a point to point connection, an optical connection, a bus connection or some other suitable connection. A North Bridge 404 is shown, also known as a Memory Controller Hub (MCH), or an Integrated Memory Controller (IMC), that handles communication between the CPU and PCIe, Dynamic Random Access Memory (DRAM), and the South Bridge. A PCIe port 403 is shown that provides a computer expansion port for connection to graphics cards and associated Graphical Processing Units (GPUs). An Ethernet port 405 is shown that is operatively connected to the North Bridge 404. A Digital Visual Interface (DVI) port 407 is shown that is operatively connected to the North Bridge 404. Additionally, an analog Video Graphics Array (VGA) port 406 is shown that is operatively connected to the North Bridge 404. Connecting the North Bridge 404 and the South Bridge 411 is a point to point link 409. In some example embodiments, the point to point link 409 is replaced with one of the above referenced physical or logical connections. A South Bridge 411, also known as an I/O Controller Hub (ICH) or a Platform Controller Hub (PCH), is also illustrated. Operatively connected to the South Bridge 411 is a High Definition (HD) audio port 408, boot RAM port 412, PCI port 410, Universal Serial Bus (USB) port 413, a port for a Serial Advanced Technology Attachment (SATA) 414, and a port for a Low Pin Count (LCP) bus 415. Operatively connected to the South Bridge 411 is a Super Input/Output (I/O) controller 416 to provide an interface for low-bandwidth devices (e.g., keyboard, mouse, serial ports, parallel ports, disk controllers). Operatively connected to the Super I/O controller 416 is a parallel port 417, and a serial port 418.

The SATA port 414 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 402 and/or within the CPU 401 during execution thereof by the computer system 400. The instructions may further be transmitted or received over the 10/100/1000 Ethernet port 405, USB port 413 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Data and instructions (of the software) are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

What is claimed is:

1. A method for reliability management of virtual machines in a node of a host system, the method comprising:

determining a reliability requirement of a virtual machine hosted by a first node of a computing system;

continuously monitoring system parameters of a plurality of other nodes of the computing system as system parameters change over time;

determining a reliability state for each of the plurality of other nodes based on the changing system parameters;

monitoring, with virtualization sensors coupled to a registry and proxy service, for at least one event affecting host reliability of the first node;

modeling the host reliability using a reliability model that is stored in the host; and when the host reliability is less than a predetermined reliability threshold for the virtual machine, identifying a second node of the plurality of other nodes whose reliability state satisfies the reliability requirement of the virtual machine and migrating the virtual machine from memory of the first node to memory of the second node.

2. The method of claim 1 wherein migrating the virtual machine comprises migrating the virtual machine to a second host having a host reliability greater than the predetermined reliability threshold.

3. The method of claim 1 wherein the at least one event affecting host reliability comprise at least one of disk errors, processor machine check events, or bus errors.

4. The method of claim 1 wherein monitoring the at least one event affecting host reliability comprises scanning system logs that track reliability altering events.

5. The method of claim 4 wherein the system logs comprise at least one of bus errors, disk errors, or temperature errors.

6. The method of claim 1 and further including modeling the host reliability using a reliability model that is learned dynamically from a learning algorithm.

7. The method of claim 6 wherein the learning algorithm is comprised of Bayesian machine learning algorithm.

8. A method for reliability management of virtual machines in a node of a host system, the method comprising:

determining a reliability threshold of a virtual machine hosted by a host node of a computing system;

continuously monitoring system parameters of a plurality of other nodes of the computing system as system parameters change over time;

scanning, with virtualization sensors coupled to a registry and proxy service, the computing system for events that affect reliability of the host node;

estimating a reliability state for each of the plurality of other nodes in response to the system parameters;

determining an estimated reliability of the host node, wherein the estimated reliability of the host node is found in a range of reliability levels determined by monitored host node parameters and a reliability model; and matching the virtual machine to a selected node of the plurality of other nodes whose estimated reliability state satisfies a reliability requirement of the virtual machine in response to the estimated reliability of the host node is less than the reliability threshold of the virtual machine.

9. The method of claim 8 and further including migrating a resident virtual machine in the host node to a second node if the resident virtual machine has a higher reliability threshold than the estimated reliability of the host node.

10. The method of claim 8 wherein scanning the host node for events that affect reliability comprise monitoring sensor data of the host node.

11. The method of claim 10 wherein monitoring the sensor data comprises monitoring at least one of Intelligent Platform Management Interface sensor data, processor machine check event sensor data, disk error data, virtual machine utility sensor data, and service level agreement data.

12. A host system comprising:
a processor;
a reliability manager configured to continuously monitor system parameters of a plurality of nodes of a computing system as system parameters change over time;
a plurality of sensor inputs configured to indicate a status of each of the system parameters and at least one event affecting reliability of a host node of the plurality of nodes hosting a virtual machine;
determining a hardware reliability state for each of the plurality of nodes, wherein the hardware reliability state is found in a range of reliability levels determined by the monitored system parameters and a reliability model; and
at least one coordinator coupled to a registry and proxy service, the at least one coordinator configured to map the hardware reliability states of the plurality of nodes to a reliability requirement of the virtual machine and, in response to the hardware reliability state of the host node is less than a reliability threshold of the virtual machine, to initiate virtual machine migration to a selected node of the plurality of nodes, wherein the selected node is a node whose hardware reliability state satisfies the reliability requirement of the virtual machine.

13. The host system of claim 12 and further including the registry and proxy service coupled to the at least one coordinator for providing discovery, meta-data registration and proxying of calls to sensors and actuators.

14. The host system of claim 13 wherein a system node further comprises virtualization sensors and actuators coupled to the registry and proxy service for monitoring.

15. The host system of claim 12 and further at least one management node configured to manage virtual machines in a plurality of system nodes and a stabilizer coupled between the management node and the plurality of system nodes to monitor system stability and prevent the at least one coordinator from performing redundant actions.

16. The host system of claim 12 wherein the host system is a storage node configured to storage data.

17. The host system of claim 12 wherein the at least one coordinator is further configured to perform proactive backup of virtual machine data on a storage node.

* * * * *